United States Patent [19]
Perry

[11] Patent Number: 5,212,900
[45] Date of Patent: May 25, 1993

[54] LIMB BRACE SUPPORT DEVICE FOR FISHING RODS

[76] Inventor: Edward Perry, Ardmore St., Box 669 R.R. 6, New Windsor, N.Y. 12550

[21] Appl. No.: 416,716

[22] Filed: Sep. 29, 1989

Related U.S. Application Data

[63] Continuation of Ser. No. 310,092, Feb. 14, 1989, abandoned.

[51] Int. Cl.$^5$ .............................................. A01K 97/10
[52] U.S. Cl. ................................... 43/21.2; 224/222; 224/267; 224/922
[58] Field of Search ............... 43/4, 21.2, 23, 25; 224/219, 222, 267, 922; 248/231.7, 230, 231.8; 128/77, 25 R

[56] References Cited

U.S. PATENT DOCUMENTS

| | | | |
|---|---|---|---|
| 1,318,260 | 10/1919 | Bosch | 623/65 |
| 2,146,350 | 2/1939 | Roberts | 43/25 |
| 2,149,837 | 3/1939 | Browne | 43/25 |
| 2,158,104 | 5/1939 | Bowen | 43/25 |
| 2,416,030 | 2/1947 | Vesper | 623/65 |
| 2,869,276 | 1/1959 | Hagen | 43/25 |
| 2,888,705 | 6/1959 | Bray | 224/222 |
| 2,969,899 | 1/1961 | Brooks | 224/267 |
| 3,154,274 | 10/1964 | Hillcourt | 43/21.2 |
| 4,214,577 | 7/1980 | Hoy | 128/25 R |
| 4,559,735 | 12/1985 | Batick, Jr. | 43/21.2 |

FOREIGN PATENT DOCUMENTS 8502091 5/1985 PCT Int'l Appl. ................ 43/21.2

Primary Examiner—Richard K. Seidel
Assistant Examiner—Jeanne M. Elpel
Attorney, Agent, or Firm—Philip Furgang

[57] ABSTRACT

A lower arm encircling brace and support portion and an upper arm encircling brace and support portion are hingedly connected together so that when fit about and to the arm of a person, to each side of their elbow, the device does not interfere with bending of the arm. Each support portion is formed of relatively flexible but sturdy material and extends almost around and for the length of their respective arm portions. Velcro straps are utilized to fit the portions snugly and securely to the person's arm. A fishing rod support fixture is carried by the device to receive and facilitate disposition and use of relatively long "spinning type" fishing rods particularly by children and persons of slight build. The fishing rod support fixture can either be disposed at the hinge connection with its disposition further supported by a stabilizing strap, or at a disposition centered end-to-end on the lower arm encircling brace and support portion. The fixture can either be one that is formed with a pair of space legs open at the extremities thereof or as a circular ring and can include alternative constructions of a pair of adjacent rings or three spaced legs forming between alternate pairs of legs two spaced openings. A cup-like butt receiver may also be utilized and constructed with cross-bar like members to seat in cross-grooves formed at the butt end of the fishing rod.

50 Claims, 2 Drawing Sheets

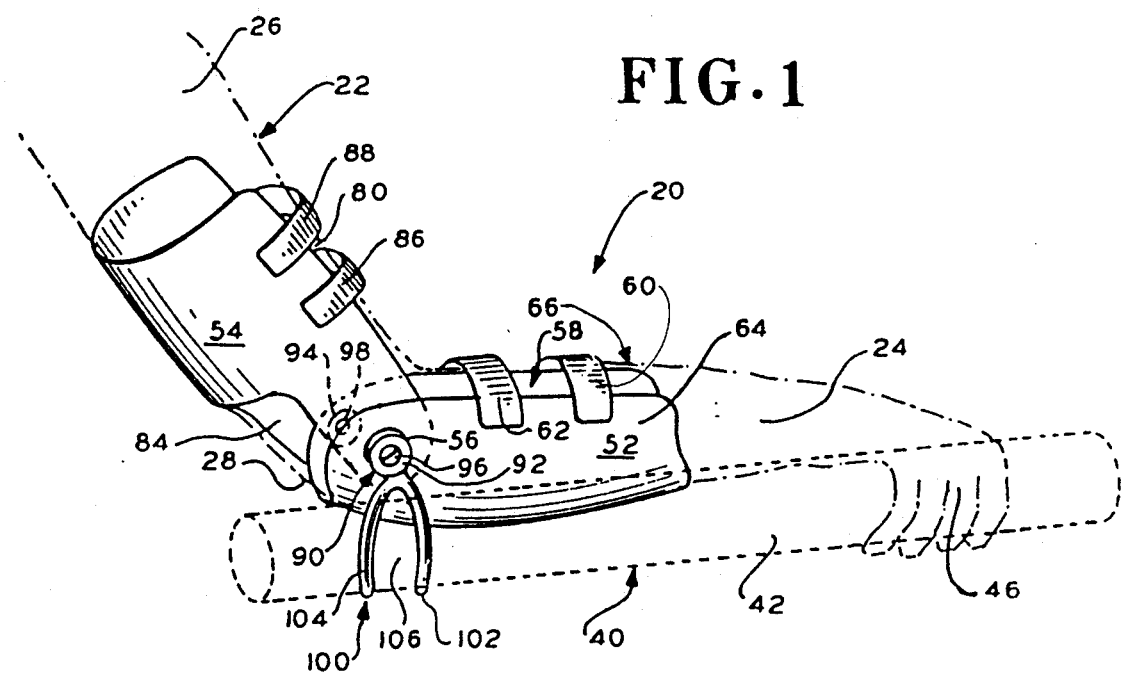

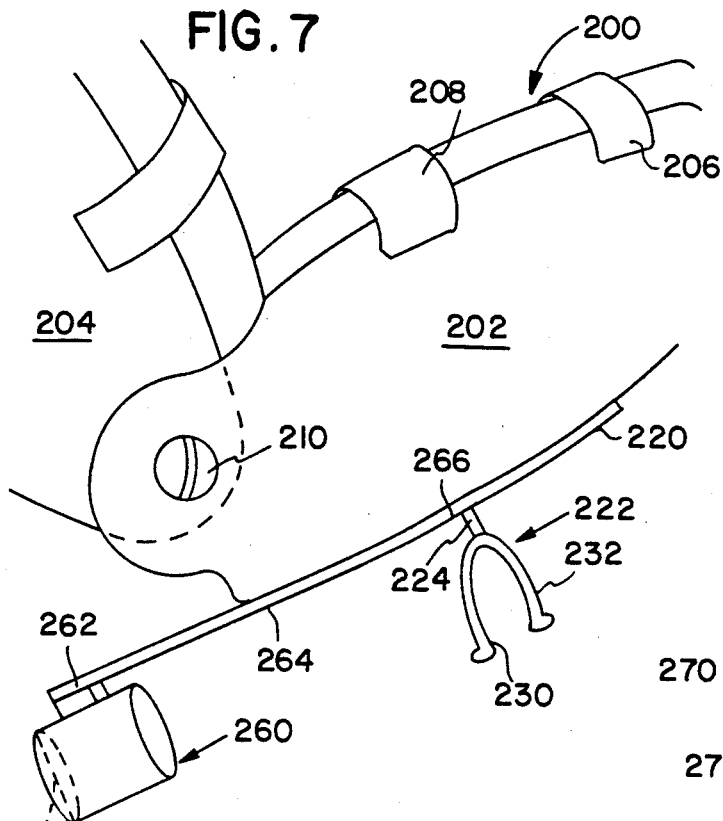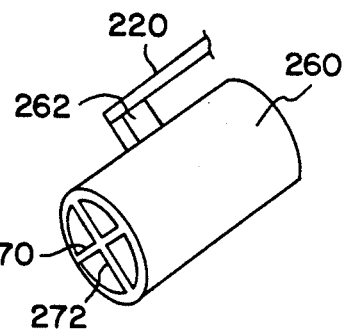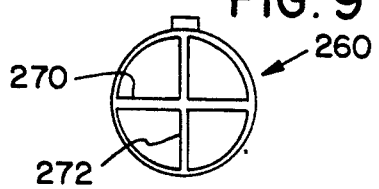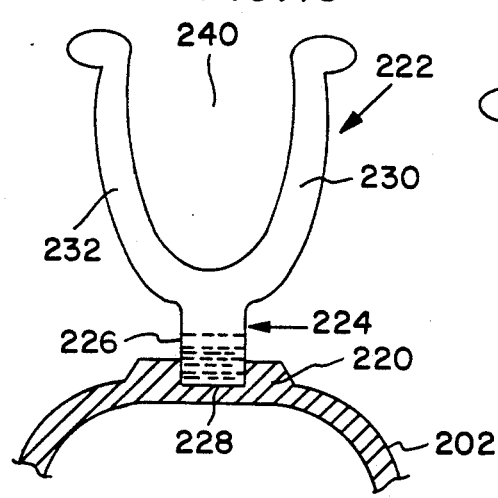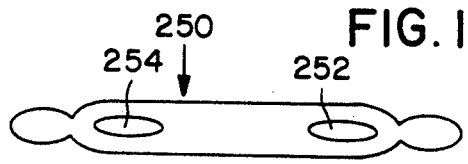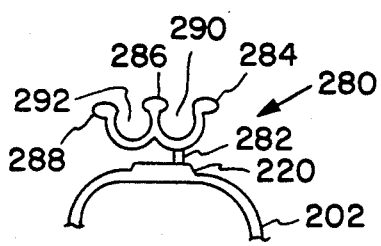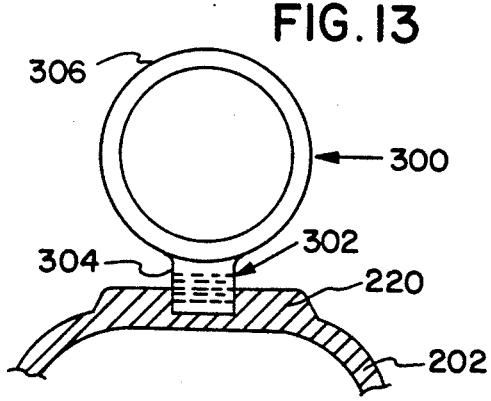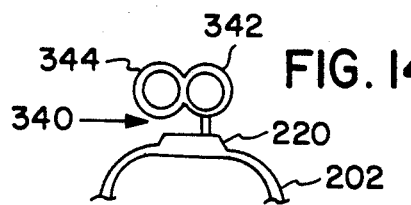

LIMB BRACE SUPPORT DEVICE FOR FISHING RODS

This is a continuation of copending application Ser. No. 07/310,092 filed on Feb. 14, 1989, now abandoned.

BACKGROUND OF THE INVENTION-FIELD OF APPLICATION

This invention relates to fishing rods and poles, and more particularly, to devices utilized with fishing rods and poles to facilitate use thereof.

BACKGROUND OF THE INVENTION-DESCRIPTION OF PRIOR ART

Fishing rods and poles are available in great many designs and a consideration number of sizes and lengths. The longer rods and poles are sometimes referred to as "spinning type" and are usually positioned for use by the fisherman in a particular way and handled in a particular way by the fisherman when they bring in fish that have been caught.

The relative length of these long "spinning" type rods or poles, and the reaction forces created between the rod and the user because of the relative length, has and does create problems which may become more pronounced when such rods are utilized by children or people with relatively slight builds.

Devices and attachments to facilitate handling of fishing rods and poles are available. However, those of the type shown and described in U.S. Pat. No. 3,372,509 granted on Mar. 12, 1968 to A. J. Arsenault for Fishing Rod Handling Device and in U.S. Pat. No. 3,372,510 granted on Mar. 12, 1968 to A. J. Arsenault for Fishing Rod Handling Device provide a grasping handle for such rods and poles as well as a support which coats with the user's arm proximate their wrists but, such an arm, or limb, support merely cradles against the arm and can obviously and relatively easily pull away from the user's arm, and as such, possibly create more harm than good.

Other devices for use with fishing rods or poles are shown and described in U.S. Pat. No. 3,367,056 granted on Feb. 6, 1968 to R. A. Johnson for Cradle Support Extension For Short Casting Rod and in U.S. Pat. No. 4,014,129 granted on Mar. 29, 1977 to G. N. Capra for Fishing Rod Stabilizing Handle. While this type of devices do not incorporate handles, as in the previously described devices, they do include a support portion which coacts with a portion of a limb of the user; i.e. their lower arm. Here again, it is obvious that relative forces between the rod and arm of the user may be such as to move the support away from the user's arm and thus possibly create more problems than desired by the user.

Still other devices for use with such fishing rod and poles are shown and described in U.S. Pat. No. 1,786,254 granted on Dec. 23, 1930 to W. H. Meehan for Fish Rod Holder and in U.S. Pat. No. 2,212,212 granted on Aug. 20, 1940 to M. Planitz for Arm Support For Fishing Rods. These devices include elements which receive and coact with a portion of the fishing pole handle and other elements which encircle and coact with a portion of a limb of the user. In the Planitz device the limb encircling portion coacts with the lower arm of the user while in the Meehan device it may coact with either the user's arm of leg; however both such devices only coact with a specific relatively small area of a single limb (i.e. lower arm for instance) of the user. Moreover, the elements of these devices which receive and coact with the fishing rod or pole only so receive the fishing rod or pole proximate the extreme end of such rods or poles.

SUMMARY OF THE INVENTION

It is therefore an object of this invention to provide a new and improved limb brace and support for use with a fishing rod or pole.

It is another object of this invention to provide a new and improved limb brace and support for use with a fishing rod or pole of the "spinning" type.

It is yet another object of this invention to provide a new and improved support and bracing device for use with a fishing rod or pole to facilitate use thereof by a child or person of relatively slight build.

It is still another object of this invention to provide a new and improved support and bracing device for use with a fishing rod or pole that establishes a coaction between a portion of the handle of the fishing rod or pole and a significant extent of the user's limb.

It is yet still another object of this invention to provide a new and improved support and bracing device for use with a relatively long fishing rod or pole that establishes a coaction between a portion of such rod or pole and both the upper and lower arms of the user.

This invention involves a support or bracing device for a fishing rod or pole to firmly and securely establish a coaction between the user's limb, such as their arm, and the rod or pole; and accomplishes same by providing a support or brace which encircles significant extents of both the upper and lower arms of the user and which also receives and coacts with a portion of the fishing rod or pole.

Other objects, features, and advantages of the invention in its details of construction and arrangement of parts will be seen from the above, from the following description of the preferred embodiments when considered with the drawing and from the appended claims.

BRIEF DESCRIPTION OF THE DRAWING

In the drawing:

FIG. 1 is a perspective view of a limb brace and support for use with a fishing rod or pole, incorporating the instant invention, and showing portions of the limbs of the user (i.e. portions of the upper and lower arms) and portions of the fishing rod in phantom to better show use thereof.

FIG. 2 is a rear view of the limb brace and support of FIG. 1 but without the phantom showings;

FIG. 3 is an enlarged elevation view of the fishing rod fixtures of the device of FIGS. 1 and 2;

FIG. 4 is a schematic showing of an alternative configuration for the fixtures of FIG. 3;

FIG. 5 is a schematic showing of another alternative configuration for the fixture of FIGS. 3 and 4;

FIG. 6 is a schematic showing of another alternative configuration for the fixture of FIGS. 3-5;

FIG. 7 is a perspective view of a portion of the limb brace of FIGS. 1-3 showing a further alternative construction for supporting the fishing rod or pole;

FIG. 8 is a perspective view of a fishing rod end receiver of the device of FIG. 7.

FIG. 9 is an end elevation view of the rod end receiver of FIG. 8;

FIG. 10 is an enlarged elevation view of the fishing rod fixture of FIG. 7;

FIG. 11 is a plan view of a retainer for use with the fixture of FIG. 10;

FIG. 12 is a schematic showing of an alternative configuration for the fixture of FIG. 10;

FIG. 13 is an enlarged elevation view of an alternative fishing rod fixture for the device of FIG. 7; and FIG. 14 is a schematic showing of an alternative configuration for the fixture of FIG. 13.

DESCRIPTION OF THE PREFERRED EMBODIMENTS

For convenience, the invention will be described as applied to a brace and support of a size and configuration to be applied to the limbs of a person which constitute their upper and lower arms and so as to span and hinge about the articulable joint therebetween constituting the elbow, of a size and configuration to be worn by an adult, and so as to coact with a relative long "spinning type" fishing rod or pole. It should be understood, nevertheless, that without departing from the spirit of the invention that it may be applied to a different limb of a person and so as to hinge about a different articulable joint thereof, that it may be of a size and configuration to be worn by a younger person such as a child or for that matter a person of any size, shape and age, and that the device can be configured and equipped to coact with any relatively long fishing rod or pole or for that matter a fishing rod or pole of any suitable size and configuration.

With reference to FIG. 1, there is shown a limb brace and support device 20 carried or worn on an arm 22 of a person (not shown) including a lower arm 24 and an upper arm 26 with their articulated joint therebetween in the form of elbow 28. The butt end 40 of a relatively long "spinning type" fishing pole 42 is shown in phantom positioned with respect to device 20 and arm 22 and so as to be grasped by a hand 46 of the person.

Fishing brace and support device 20 includes a first portion 52 (FIGS. 1 and 2) a second portion 54 connected together by an articulating hinge joint 56. First portion 52 is of a size and configuration to fit about a relatively substantial portion of lower arm 24 and is formed with a longitudinally extending opening 58 that permits the persons hand 46 to extend out one end and elbow 28 to extend out the other. Thus, in an open cast like manner first portion 52 cradles lower arm 24. Portion 52 is formed from a suitable and somewhat flexible plastic material, or, if desired, a composite material, that will accept molding to the desired configuration and that will also facilitate a relatively snug and secure fit of portion 52 about lower arm 24 as will be hereinafter described.

A pair of straps 60, 62 span opening 58 and act to bring free ends 64, 66 of portion 52 towards each other to accomplish a snug and comfortable fit of portion 52 on lower arm 24. Straps 60, 62 can be of a "VELCRO" type and configured for coaction with mating elements carried by the appropriate side of portion 52. Alternatively, they can be of any strap materials and, if desired, of a configuration and construction to coact with buckles also carried by portion 52.

Second portion 54 of fishing brace and support 20 is constructed similarly to that of first portion 52 but of a size and configuration to be worn or fitted to upper portion 26 of arm 22. A longitudinal opening 80 extends the length of portion 54 and permits an upper extremity of upper arm 26 to extend out from one end thereof and a lower extremity, including elbow 28 to extend out from the other end thereof. A cut-out 84 is formed in second portion 54 to accommodate and permit articulation of elbow 28. Second portion 54 is also formed of materials and of sizes and configurations similar to that of first portion 52. A pair of straps 86, 88 span opening 80. Straps 86, 88 are of constructions as described above for straps 60, 62 and coact in the same manner.

A hinge connection 90, hingedly connects first portion 52 and second portion 54 to permit relative hinged movement therebetween to accommodate movement of arm 22 at elbow 28, and includes a first hinge member 92 and a second hinge member 94. Each hinge member 92, 94 is identical and includes an externally threaded member 96 (FIG. 1) that is received in an internally threaded member 98 such that relative hinge like motion is permitted between first portion 52 and second portion 54.

A fishing rod or pole guide fixture 100 (FIGS. 1, 2 and 3) of device 20 is carried thereby at hinge connection 90. Fixture 100 includes a pair of arms 102, 104 spaced one from the other and with an opening 106 therebetween in somewhat of an open oar-lock configuration. A base portion 110 of fixture 100 receives an externally threaded securing member 112 that is, in turn, threadably received by member 98 of hinge connection 90. Fixture 100 is mounted on member 112 so as to be somewhat spaced from hinge connection 90 and portions 52 and 54. A stabilizer tab 120 has one end thereof connected at 122 to fixture 100 and another end thereof connected at 124 to first portion 52 of device 20 and acts to stabilize fixture 100 thereon. Fixture 100 and stabilizer 120 may be formed of any suitable plastic or metal.

Legs 102, 104 may be configured so that opening 106 therebetween extends in a direction other than down.

In use a person inserts their arm through portions 52 and 54 so that their lower arm 24 is cradled in portion 52, their upper arm 26 is cradled in portion 54 and their elbow 28 is disposed at cut-out 84. Straps 60, 62, 86 and 88 are tightened to secure device 20 in place and thereafter butt end 40 of a fishing rod or pole 42 is disposed in opening 106 of fixture 100 while rod 42 is otherwise grasped by hand 46 of the person. Rod 42 is now supported and braced as an extension of arm 22 and arm 22 is supported and strengthened so that rod 42 can be more easily manipulated and otherwise used; especially by a child or person of slight build.

If desired a fixture 130 (FIG. 4) may be substituted for fixture 100; with fixture 130 constructed and configured similar to fixture 100 and including spaced legs 132, 134, 136 and two openings 140, 142 thus establishing two alternate positions for butt end 40 of rod or pole 42.

Another alternative fixture 150 is shown in FIG. 5 and includes a circular ring 152 to receive butt end 40 of fishing rod or pole 42 instead of the spaced legs 102, 104 of fixture 100. Fixture 150 is otherwise constructed and configured like fixture 100 and is secured at hinge connection 90 like fixture 100 (FIG. 1).

Still another alternative fixture 170 is shown in FIG. 6 and includes a pair of circular rings 172, 174 each of a size and configuration to receive butt end 40 of rod 42. Fixture 170 is otherwise constructed like fixture 150 (FIG. 5) and is similarly carried by device 20.

An alternative embodiment of limb brace and support device 200 for a fishing rod or pole is shown in FIG. 7. Device 200 includes a first portion 202 of a size, configuration and construction similar to those described for first portion 52 of device 20, and a second portion 204 of a size, configuration, and construction similar to those described for second portion 54 of device 20. A hinge connection 210, similar in construction to hinge connection 90 of device 20, hingedly connects first portion 202 and second portion 204 in the manner that hinge connection 90 connects portions 52 and 54 of device 20.

Device 200 is fitted to the arm of the fisherman as was device 20 but supports the fishing rod in an alternative manner.

A fixture support section 220 is formed with or carried by first portion 202 and, in turn, supports a rod fixture 222 (FIGS. 7 and 10). Rod fixture 222 is formed of material and in a configuration similar to fixture 100 (FIG. 3) but instead includes a base 224 (FIG. 10) formed with external threads 226 that are received in an internally threaded fixture receiver 228 carried by or formed in support section 220. A pair of spaced legs 230, 232 extend up from base 224 and are separated at their free ends to form a space 240 of a size and configuration to receive the butt end of a fishing rod or pole. A keeper or retainer 250 (FIG. 11) is formed of a size and configuration to span legs 230, 232 (FIG. 10) and with a pair of openings 252, 254 (FIG. 11) to fit snugly thereover and be maintained in place once so positioned. Keeper 250 may be formed of rubber, plastic or the like so that it may be repeatedly positioned on legs 230, 232 and/or removed therefrom.

A cup like butt retainer 260 (FIGS. 7, 8 and 9) is carried at an end 262 (FIG. 7) of an extension 264 the other end 266 of which is suitably secured to support section 220 of portion 202. Retainer 260 is of a size and configuration to receive the butt end of a fishing rod or pole and is particularly constructed to coact with a butt end of a fishing rod or pole that has pair of intersecting grooves formed therein. A pair of cross hairs 270, 272 of steel or other suitable material span the lowermost end of retainer 260 and are formed of a size and configuration to seat within crossed grooves formed in the butt end of a fishing rod or pole to restrict and preferably prevent rotation of the rod or pole with respect to device 200.

In use the fisherman extends their arm into second portion 204 and first portion 202 of device 200 and then closes straps 206, 208 to snugly and securely fit device 200 in place. The butt end of a fishing rod or pole is then disposed in fixture 222 with its extreme end positioned in retained 260 and is thereafter grasped by the fisherman's hand. Keeper 250 may then be placed on legs 230, 232 of fixture 222.

FIG. 12 shows an alternative fixture 280 that includes a base 282 similar to base 224 in that it is externally threaded for mounting to support 228 and is constructed of materials and in a configuration similar to that of fixture 222. Fixture 280, however, includes three legs 284, 286, 288 that are spaced one from the other so as to form a pair of openings 290, 292 each of a size and configuration to receive the butt end of a fishing rod or pole. If desired a keeper (not shown) such as keeper 250 (FIG. 11) may be constructed for cooperation with legs 284, 286, 288 of fixture 280.

FIG. 13 shows yet another alternative configuration for a fixture 300. A base 302 is formed on fixture 300 with external threads 304 of a size and configuration to mount fixture 300 to support section 220 of brace portion 202. A fishing rod receiving ring 304 extends from base 302 and is of a size and configuration to receive the butt end of a fishing rod or pole. The fixture of FIG. 13 may alternatively be constructed as shown for fixture 340 (FIG. 14) with a pair of rings 342, 344 each of a size and configuration to receive the butt end of a fishing rod or pole.

It will thus be seen that there has been shown a number of embodiments of braces and supports for fishing rods or poles that are sized and configured to be relatively easily carried by and secured to a limb of a user so as not to interfere with the normal articulated use of the limb while at the same time forming with the limb an effective positioning support for fishing rods or poles; particularly of the relatively long "spinning type" and especially when used by a child or person of slight build.

It is understood that although I have shown the preferred form of my invention that various modifications may be made in the details thereof without departing from the spirit as comprehended by the following claims.

What is claimed is:

1. A brace and support device to be fitted to and worn by an articulated limb of a person to facilitate hand holding of a fishing rod or pole; comprising:
    (a) a first brace and support portion of a size and configuration to cradle a first part of the person's limb proximate and to a first side of where it articulates;
    (b) a second brace and support portion of a size and configuration to cradle a second part of the person's limb proximate and to a second side of where it articulates;
    (c) hinge means hingedly connecting said first brace and support portion and said second brace and support portion to permit articulation of the person's limb when worn thereby; and
    (d) fishing rod fixture means carried by at least one of said portions and being of a size and configuration to receive and facilitate support of a fishing rod when hand held.

2. The device of claim 1, wherein said fixture means is carried by said first brace and support portion.

3. The device of claim 1, wherein said first brace and support portion and said second brace and support portion are each formed to substantially encircle a respective portion of the person's limb and to extend a substantial portion of the length of the respective limb.

4. The device of claim 3, wherein strap means are carried by each said first brace and support portion and said second brace and support portion to snugly secure each of same in place.

5. The device of claim 4, wherein said strap means each include hook and loop type connections.

6. The device of claim 1, including fixture support means carried by at least one of said first brace and support portion or said second brace and support portion.

7. The device of claim 6, wherein said fixture support means is carried by said first brace and support portion.

8. The device of claim 1, wherein said first brace and support portion is of a size and configuration to cradle a person's lower arm and said second brace and support portion is of a size and configuration to cradle a person's upper arm.

9. A device to be fitted to and worn by an articulated limb of a person to facilitate their hand holding of a fishing rod or pole; comprising:

(a) a first device portion of a size and configuration to cradle a first part of the person's limb proximate and to a first side of where it articulates;

(b) a second device portion of a size and configuration to cradle a second part of the person's limb proximate and to a second side of where it articulates;

(c) articulation means connecting said first device portion and said device portion to permit articulation of the person's limb when worn thereby; and (d) fishing rod fixture means carried by at least one of said portions and being of a size and configuration to receive and facilitate support of a fishing rod when hand held.

10. The device of claim 9, wherein said fixture means is carried by said first device portion.

11. The device of claim 9, wherein said first device portion and said second device portion are each formed to encircle a respective portion of the person's limb.

12. The device of claim 11, wherein said first device portion and said second device portion each substantially encircle the respective portion of the person's limb.

13. The device of claim 11, wherein said first device portion and said second device portion extend a substantial portion of the length of the respective limbs.

14. The device of claim 11, wherein said first device portion is formed to encircle the lower arm of a person and said second device portion is formed to encircle the upper arm of a person.

15. The device of claim 11, wherein strap means are carried by each said first device portion and said second device portion to snugly secure each of same in place.

16. The device of claim 15, wherein said strap means each include hook and loop type connections.

17. The device of claim 9, including fixture support means carried by at least one of said first device portion or said second device portion.

18. The device of claim 17, wherein said fixture support means is carried by said first device portion.

19. The device of claim 18, wherein a fishing rod fixture is carried by said fixture support means and is of a size and configuration to receive the butt end of a fishing rod.

20. The device of claim 19, wherein fishing rod fixture means is formed with at least one circular ring of a size and configuration to receive therewithin the butt end of a fishing rod.

21. The device of claim 19, wherein fishing rod fixture means is formed with three legs spaced one from the other to define between a first adjacent pair thereof a first opening of a size and configuration to receive the butt end of a fishing rod and between a second adjacent pair thereof a second opening also of a size and configuration to receive the butt end of a fishing rod.

22. The device of claim 9, wherein said articulation means comprising hinge means hingedly connecting said first device portion and said second device portion.

23. A brace and support device to be fitted to and worn by an articulated limb of a person to facilitate their use of a fishing rod or pole; comprising:

(a) a first brace and support portion of a size and configuration to cradle a first part of the person's limb proximate and to a first side of where it articulates;

(b) a second brace and support portion of a size and configuration to cradle a second part of the person's limb proximate and to a second side of where it articulates;

(c) hinge means hingedly connecting said first brace and support portion and said second brace and support portion to permit articulation of the person's limb when worn thereby; and (d) fishing rod fixture means carried by at least one of said portions and disposed proximate said hinge means, and being of a size and configuration to receive and facilitate support of a fishing rod.

24. The device of claim 23, including stabilizing tab means extending from said fixture means and being connected to either said first brace and support portion or said second brace and support portion.

25. The device of claim 24, wherein said fixture means is formed with at least a pair of legs spaced one from the other and of a size and configuration to receive therebetween the butt end of a fishing rod.

26. The device of claim 25, wherein said fixture means is formed with three legs spaced one from the other to define between a first adjacent pair thereof a first opening of a size and configuration to receive the butt end of a fishing rod and between a second adjacent pair thereof a second opening also of a size and configuration to receive the butt end of a fishing rod.

27. The device of claim 24, wherein said fixture means is formed with at least a first circular ring of a size and configuration to receive therewithin the butt end of a fishing rod.

28. The device of claim 27, wherein said fixture means is formed with at least a pair of rings each of which is of a size and configuration to receive therewithin the butt end of a fishing rod.

29. A brace and support device to be fitted to and worn by an articulated limb of a person to facilitate their use of a fishing rod or pole, comprising:

(a) a first brace and support portion of a size and configuration to cradle a first part of the person's limb proximate and to a first side where it articulates;

(b) a second brace and support portion of a size and configuration to cradle a second part of the person's limb proximate and to a second side of where it articulates;

(c) hinge means hingedly connecting said first brace and support portion and said second brace and support portion to permit articulation of the person's limb when worn thereby;

(d) fishing rod support means carried by a least one of said portions and being of a size and configuration to receive and facilitate support of a fishing rod; and (e) fishing rod fixture means carried by said one brace and support portion and including a cup-like rod butt receiver.

30. The device of claim 29, wherein said rod butt receiver includes a set of cross-hair like rods of a size and configuration to be received in cross-hair like grooves when formed in the butt end of a fishing rod to coact therewith to prevent or minimize rotation of the rod.

31. A brace and support device to be fitted to and worn by an articulated limb of a person, the articulated limb being of the type having a hand or similar grasping means facilitating the use of a fishing rod or pole, comprising:

(a) a first brace and support portion of a size and configuration to cradle a first part of the person's limb proximate and to a first side of where it articulates;

(b) a second brace and support portion of a size and configuration to cradle a second part of the person's limb proximate and to a second side of where it articulates;

(c) hinge means hingedly connecting said first brace and support portion and said second brace and support portion to permit articulation of the person's limb when worn thereby;

(d) fishing rod support means carried by a least one of said portions; and (e) fishing rod fixture means carried by said fishing rod support means being of a size and configuration to receive the butt end of a fishing rod so that the rod may be more easily grasped by the grasping means.

32. The device of claim 31, wherein fishing rod fixture means is formed with at least a pair of legs spaced one from the other and otherwise of a size and configuration to receive therebetween the butt end of a fishing rod.

33. the device of claim 32, including a keeper including retaining means coacting with said pair of legs to retain a rod in the space therebetween.

34. The device of claim 31, wherein fishing rod fixture means is formed with at least one circular ring of a size and is formed with at least one circular ring of a size and configuration to receive therewithin the butt end of a fishing rod.

35. The device of claim 34, wherein fishing rod fixture means is formed with at least a pair of circular rings each of a size and configuration to receive therewithin the end of a fishing rod.

36. The device of claim 31, wherein fishing rod fixture means is formed with three legs spaced one from the other to define between a first adjacent pair thereof a first opening of a size and configuration to receive the butt end of a fishing rod and between a second adjacent pair thereof a second opening also of a size and configuration to receive the butt end of a fishing rod.

37. A brace and support device to be fitted to and worn by an articulated limb of a person to facilitate their use of a fishing rod or pole; comprising:

(a) a first brace and support portion of a size and configuration to cradle a first part of the person's limb proximate and to a first side of where it articulates;

(b) a second brace and support portion of a size and configuration to cradle a second part of the person's limb proximate and to a second side of where it articulates;

(c) hinge means hingedly connecting said first brace and support portion and said second brace and support portion to permit articulation of the person's limb when worn thereby; and (d) fishing rod fixture means carried by said first brace and support portion; and (e) stabilizing tab means extending from said fixture means and connected to said first brace portion.

38. A device to be fitted to and worn by an articulated limb of a person to facilitate their use of a fishing rod or pole; comprising:

(a) a first device portion of a size and configuration to cradle a first part of the person's limb proximate and to a first side of where it articulates;

(b) a second device portion of a size and configuration to cradle a second part of the person's limb proximate and to a second side of where it articulates;

(c) articulation means connecting said first device portion and said device portion to permit articulation of the person's limb when worn thereby; and (d) fishing rod fixture means carried by at least one of said portions and being disposed proximate said articulation means and of a size and configuration to receive and facilitate support of a fishing rod.

39. The device of claim 38, including stabilizing tab means extending from said fixture means and being connected to either said first device portion.

40. The device of claim 39, where said fixture means is formed with at least a pair of legs spaced one from the other and of a size and configuration to receive therebetween the butt end of a fishing rod.

41. The device of claim 40, wherein said fixture means is formed with three legs spaced one from the other to define between a first adjacent pair thereof a first opening of a size and configuration to receive the butt end of a fishing rod and between a second adjacent pair thereof a second opening also of a size and configuration to receive the butt end of a fishing rod.

42. The device of claim 39, wherein said fixture means is formed with at least a first circular ring of a size and configuration to receive therewithin the butt end of a fishing rod.

43. The device of claim 42, wherein said fixture means is formed with at least a pair of rings each of which is of a size and configuration to receive therewithin the butt end of a fishing rod.

44. A device to be fitted to and worn by an articulated limb of a person to facilitate their use of a fishing rod or pole; comprising:

(a) a first device portion of a size and configuration to cradle a first part of the person's limb proximate and to a first side of where it articulates;

(b) a second device portion of a size and configuration to cradle a second part of the person's limb proximate and to a second side of where it articulates;

(c) articulation means connecting said first device portion and said device portion to permit articulation of the person's limb when worn thereby;

(d) fishing rod fixture means carried by said first device portion and being disposed proximate said articulation means and of a size and configuration to receive and facilitate support of a fishing rod; and (e) stabilizing tab means extending from said fixture means and being connected to said first device portion.

45. A device to be fitted to and worn by an articulated limb of a person to facilitate their use of a fishing rod or pole, comprising:

(a) a first device portion of a size and configuration to cradle a first part of the person's limb proximate and to a first side of where it articulates;

(b) a second device portion of a size and configuration to cradle a second part of the person's limb proximate and to a second side of where it articulates;

(c) articulation means connecting said first device portion and said device second portion to permit articulation of the person's limb when worn thereby;

(d) fishing rod support means carried by at least one of said portions; and (e) fishing rod fixture means carried by said fishing rod support means; and (f) said fishing rod support means including a cup-like rod butt receiver carried by said fishing rod fixture means.

46. The device of claim 45, wherein said rod butt receiver includes a set of cross-hair like rods of a size and configuration to be received in cross-hair like grooves when formed in the butt end of a fishing rod to coact therewith to prevent or minimize rotation of the rod.

47. A device to be fitted to and worn by an articulated limb of a person, the articulated limb being of the type having a hard or similar grasping means facilitating their use of a fishing rod or pole; comprising:

(a) a first brace and support portion of a size and configuration to cradle a first part of the person's limb proximate and to a first side of where it articulates;

(b) a second device portion of a size and configuration to cradle a second part of the person's limb proximate and to a second side of where it articulates;

(c) articulation means connecting said first device portion and said second device portion to permit articulation of the person's limb when worn thereby;

(d) fishing rod support means carried by at least one of said portions; and (e) fishing rod fixture means carried by said fishing rod support means being of a size and configuration to receive the butt end of a fishing rod so that the rod may be more easily grasped by the grasping means;

(f) said fishing rod fixture means is formed with at leaser a pair of legs spaced one from the other and otherwise of a size and configuration to receive therebetween the butt end of a fishing rod.

48. The device of claim 47, including a keeper including retaining means coacting with said pair of legs to retain a rod in the space therebetween.

49. A device to be fitted to and worn by an articulated limb of a person to facilitate their use of a dishing rod or pole; comprising:

(a) a first device portion of a size and configuration to cradle a first part of the person's limb proximate and to a first side of where it articulates;

(b) a second device portion of a size and configuration to cradle a second part of the person's limb proximate and to a second side of where it articulates;

(c) articulation connecting said first device portion and said second device portion to permit articulation of the person's limb when worn thereby;

(d) fishing rod support means carried by at least one of said portions; and (e) fishing rod fixture means carried by said fishing rod support means being of a size and configuration to receive the butt end of a fishing rod;

(f) said fishing rod fixture means being formed with at least one circular ring of a size and configuration to receive therewithin the butt end of a fishing rod.

50. A device to be fitted to and worn by an articulated limb of a person to facilitate their use of a fishing rod or pole; comprising:

(a) a first device portion of a size and configuration to cradle a first part of the person's limb proximate and to a first side of where it articulates;

(b) a second device portion of a size and configuration to cradle a second part of the person's limb proximate and to a second side of where it articulates;

(c) articulation means connecting said first device portion and said second device portion to permit articulation of the person's limb when worn thereby;

(d) fishing rod support means carried by at least one of said portions; and (e) fishing rod fixture means carried by said fishing rod support means being of a size and configuration to receive the butt end of a fishing rod;

(f) said fishing rod fixture means being formed with three legs spaced one from the other to define between a first adjacent pair thereof a first opening of a size and configuration to receive the butt end of a fishing rod and between a second adjacent pair thereof a second opening also of a size and configuration to receive the butt end of a fishing rod.

* * * * *